(12) United States Patent
Cao et al.

(10) Patent No.: US 11,800,835 B2
(45) Date of Patent: Oct. 31, 2023

(54) OPTICAL SYSTEM FOR FACILITATING PLANT GROWTH HAVING NON-UNIFORM LIGHT DENSITY DISTRIBUTION

(71) Applicant: Verdant Lighting Technology, Inc., Cypress, TX (US)

(72) Inventors: Liangliang Cao, Shenzhen (CN); Qian Zhang, Cypress, TX (US)

(73) Assignee: Verdant Lighting Technology, Inc., Cypress, TX (US)

( * ) Notice: Subject to any disclaimer, the term of this patent is extended or adjusted under 35 U.S.C. 154(b) by 0 days.

(21) Appl. No.: 17/422,078

(22) PCT Filed: Jan. 10, 2020

(86) PCT No.: PCT/US2020/013199
§ 371 (c)(1),
(2) Date: Jul. 9, 2021

(87) PCT Pub. No.: WO2020/146808
PCT Pub. Date: Jul. 16, 2020

(65) Prior Publication Data
US 2022/0095546 A1 Mar. 31, 2022

Related U.S. Application Data

(60) Provisional application No. 62/790,721, filed on Jan. 10, 2019.

(51) Int. Cl.
*A01G 7/04* (2006.01)
*F21V 5/04* (2006.01)
*F21Y 115/10* (2016.01)

(52) U.S. Cl.
CPC ............... *A01G 7/045* (2013.01); *F21V 5/04* (2013.01); *F21Y 2115/10* (2016.08)

(58) Field of Classification Search
CPC ...... A01G 7/04–045; F21V 5/007–048; F21Y 2115/10
See application file for complete search history.

(56) References Cited

U.S. PATENT DOCUMENTS

| | | | |
|---|---|---|---|
| 9,551,471 B2* | 1/2017 | Donners | ............... F21V 5/04 |
| 10,028,449 B2* | 7/2018 | Takashima | ............ A01G 7/045 |
| 2013/0215611 A1 | 8/2013 | Wong et al. | |
| 2014/0339440 A1* | 11/2014 | Schadt | ............... G02B 13/0085 438/69 |
| 2015/0313090 A1 | 11/2015 | Weiss et al. | |
| 2018/0092308 A1 | 4/2018 | Barber, III et al. | |
| 2018/0356067 A1 | 12/2018 | Duong et al. | |
| 2018/0363884 A1* | 12/2018 | Frison | ............... F21V 7/05 |
| 2019/0120460 A1* | 4/2019 | Pelka | ............... F21V 5/04 |

FOREIGN PATENT DOCUMENTS

WO   2019204453 A1   10/2019

OTHER PUBLICATIONS

International Search Report and Written Opinion; PCT Application No. PCT/US2020/013199, dated Apr. 14, 2020.

* cited by examiner

*Primary Examiner* — Jason M Han
(74) *Attorney, Agent, or Firm* — Polsinelli PC

(57) ABSTRACT

An optical system for facilitating plant growth can include one or more light sources operable to produce a light density distribution having a central portion and a peripheral portion. The light density distribution having a central portion has a lower light density than the peripheral portion, thereby producing a substantially non-uniform light density distribution.

16 Claims, 14 Drawing Sheets

OPTICAL SYSTEM FOR FACILITATING PLANT GROWTH HAVING NON-UNIFORM LIGHT DENSITY DISTRIBUTION

CROSS-REFERENCE TO RELATED APPLICATIONS

This application is a national stage application of International Application No. PCT/US2020/013199, which was filed on Jan. 10, 2020, which claims the benefit of U.S. Provisional Application No. 62/778,121, filed on Jan. 10, 2019, the contents of both are incorporated by reference herein in their entirety.

FIELD

The present disclosure relates generally to systems for improving efficiency and yields in plant growing operations.

BACKGROUND

Indoor farming and horticultural operations where plants are grown under artificial lighting are getting more and more important in the recent years. Some advantages of indoor plant growth operations include allowing for extended growing cycles, increased yields per unit area, fine tuning of environmental variables including light output to enhance plant yields, security and ability of monitoring the operation in real time.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative examples, in which the principles of the disclosure are utilized, and the accompanying drawings of which:

DETAILED DESCRIPTION

Figure 1:
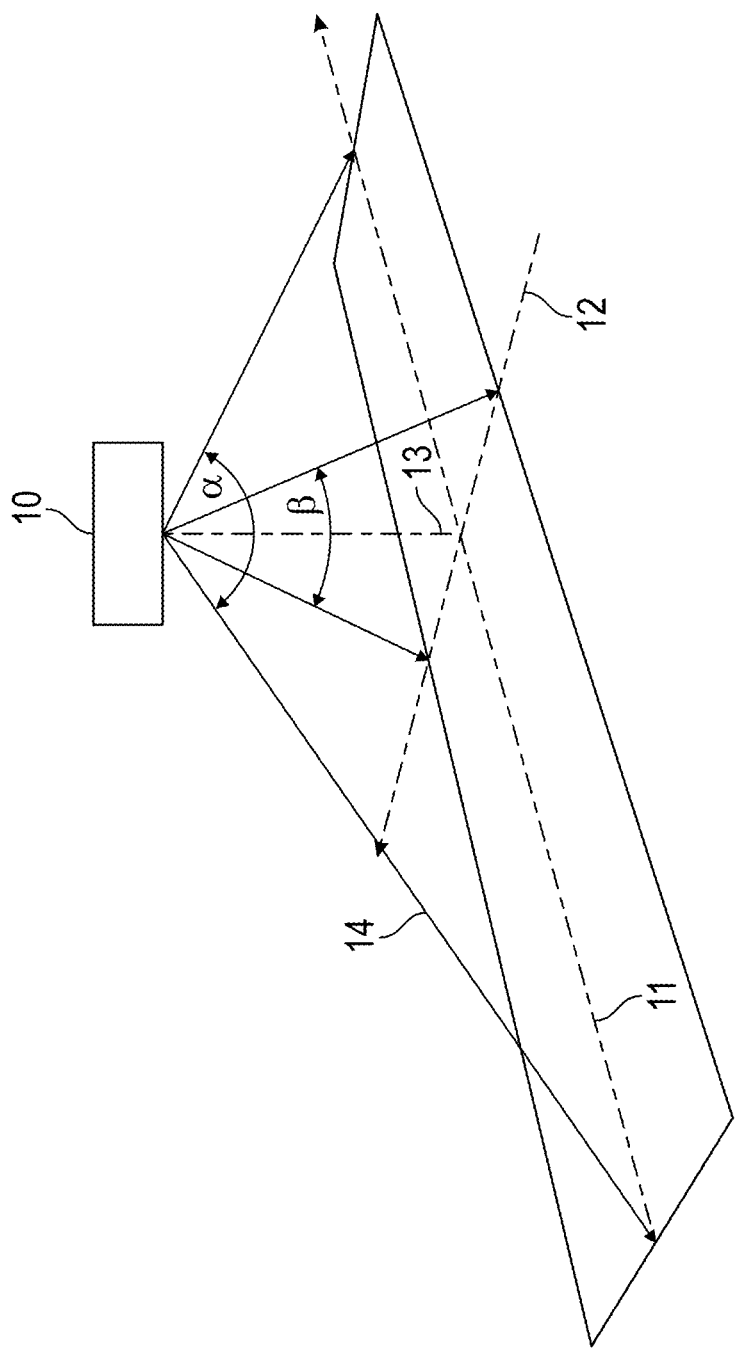
FIG. 1 is a diagrammatic view of an optical system and the light beam emitted by the optical system according to at least one example of the present disclosure.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

Additionally, any examples or illustrations given herein are not to be regarded in any way as restrictions on, limits to, or express definitions of, any term or terms with which they are utilized. Instead these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or can not be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present disclosure.

Optical systems described herein provide a light beam with a full width at half-maximum (FWHM) angle of greater than one hundred twenty degrees (120°) in one or more transverse directions. The one or more transverse direction are substantially perpendicular to the optical axis of the light beam. In some instances, the optical axis of the light beam can be perpendicular to the light emitting surface of the optical system or parallel to the central axis of the optical system. In some instances, the optical axis of the light beam is the same axis as a central axis of the optical system.

According to at least one example, a light spot illuminated by the light beam on a projection plane at a distance from the optical system can be polygonal, circular, and/or elliptical in shape. The optical power density in the light spot is substantially uniform.

The projection plane can be a plane (for example, a plant bed) located in the light path of the optical system and at a distance from the optical system. A projection surface can be an area upon an object located in the projection plane, and the light beam provided by the optical system is received by the projection surface.

According to at least one example, the light beam has an FWHM angle between 120 degrees and 160 degrees in one or more transverse directions.

According to at least one example, the optical system is configured to produce a light beam having an FWHM angle of greater than one hundred twenty degrees (120°) in a first transverse direction, and having an FWHM angle of less than one hundred twenty degrees (120°) in a second transverse direction. The first transverse direction and the second transverse direction can be substantially perpendicular to each other. The optical system can be configured to produce a light beam having an FWHM angle of greater than one hundred thirty degrees (130°) in the first transverse direction, and having an FWHM angle of less than eighty degrees (80°) in the second transverse direction. The optical system can further be configured to produce a light beam having an FWHM angle of greater than one hundred thirty degrees (130°) in the first transverse direction, and having an FWHM angle of less than fifty degrees (50°) in the second transverse direction. The optical system can be configured to illuminate one or more plants in a lateral direction, with the first transverse direction along one or more lateral sides of the one or more plants. The optical system can be configured to illuminate one or more plants obliquely vertically, with the angle between the optical axis of the optical system and a horizontal plane being greater than ten degrees (10°). The angle with respect to the horizontal direction can be greater than half of the FWHM angle in the second transverse direction.

According to at least one example, the optical power density in a light spot illuminated by the light beam on a projection surface at a distance from the optical system is substantially uniform. The projection surface can be a surface of a conical body or a plane.

According to at least one example, a light spot illuminated by the light beam on a projection surface can have an average optical power density on an intermediate region in the light spot equal to or less than average optical power density on a first region, wherein the first region is an annular region surrounding the intermediate region in the light spot. The light spot can be a portion of the projection surface illuminated by the light beam. In one or more transverse directions, the light intensity of light can increase from the optical axis to the periphery. In one or more transverse directions, the light intensity distribution of the light beam $I(\theta)$ can be substantially equal to $I_0/\cos^3(\theta)$, where $I_0$ is the light intensity of the light at the optical axis and $I(\theta)$ is the light intensity of the light having an angle $\theta$ relative to the optical axis. Average optical power density on the intermediate region in the light spot can be a global minimum in the light spot.

According to at least one example, a light spot illuminated by a light beam on a projection plane can comprise two or more illuminated areas, wherein each illuminated area illuminates one or more plant and/or plant pot. The light intensity distribution of each illuminated area can have a trough and two crest located on two opposite sides of the trough in one or more transverse directions. The trough can be located at a longitudinal direction having an angle $\theta$ with respect to the optical axis. The angle $\theta$ can be about forty five degrees (450°). One of the two crest can be located at a longitudinal direction having an angle of about seventy five degrees (75°) with respect to the optical axis, and the other of the two crest can be located at a longitudinal direction having an angle of about fifteen degrees (15°) with respect to the optical axis. The average optical power density on a gap area between two adjacent illuminated areas can be less than the minimum optical power density on the illuminated areas. The ratio of light energy on the gap area between two adjacent illuminated areas relative to the total energy of the light beam can be less than twenty percent (20%). The gap area between two adjacent illuminated areas corresponds to an angle of less than about thirty five degrees (35°).

According to at least one example, the optical system can include a first LED array and a second LED array, wherein the optical axis of the first LED array and the optical axis of the second LED array extend in different directions. The optical axis of the first LED array and the optical axis of the second LED array can form an angle of between twenty and one hundred twenty degrees (20-120°) between each other. The optical axis of the first LED array and the optical axis of the second LED array can from an angle relative to the optical axis of the optical system, respectively. The angle can be between from about ten degrees (10°) to sixty degrees (60°).

According to at least one example, the light beam can have spectra including blue wavelengths and red wavelengths.

According to at least one example, the one or more light sources can include at least one light source of the one or more light sources operable to emit a light beam having different wavelengths, and the at least one light source operable to emit a light beam having different wavelengths are controllable individually.

It shall be understood that different aspects of the disclosure can be appreciated individually, collectively, or in combination with each other. Various aspects of the disclosure described herein can be applied to any of the particular applications set forth below or for any other types of movable objects. Any description herein of aerial vehicles, such as unmanned aerial vehicles, can apply to and be used for any movable object, such as any vehicle.

Other objects and features of the present disclosure will become apparent by a review of the specification, claims, and appended figures Examples described herein provide an optical system that creates a light beam having an FWHM angle of greater than about 120 degrees in one or more transverse directions, wherein the transverse direction is substantially perpendicular to the optical axis of the optical system. The optical system can be created using one or more light sources. The term "light source" is defined to include any element capable of producing a light beam (visible or invisible to the human eye) including, but not limited to, a light emitting diode (LED), a compact fluorescent light (CFL), a fluorescent, an incandescent, an infrared, a metal halide light, and/or a high pressure sodium light.

In one or more examples, the light beam(s) emitted from the light sources are combined into one light beam and emitted. In some examples, the plurality of light sources can be arranged in an array shape, wherein the array can be a polygon shape including, but not limited to, a square array, a rectangular array, a circular array. In at least one example, the plurality of light sources is arranged in a plurality of concentric rings.

In one or more examples, the optical system further comprises one or more optical elements for collecting, shaping, and/or uniformization of the light emitted from the light sources. For example, a lens or a compound parabolic concentrator (CPC) can be disposed on the light emitting side of each light source for shaping and/or uniformization of the light emitted from the light source. Alternatively, multiple light sources can share one lens or one CPC, which is used to uniformize and/or shape the combined beams of the multiple light sources.

The optical system can produce a beam of light having a wide variety of complex spectra, including, but not limited, blue wavelengths, green wavelengths, red wavelengths, ultraviolet, and/or infrared wavelengths. Specifically, for example, the beam of light emitted by the optical system comprises at least one wavelengths of 450 nanometers (nm), 575 nm, 660 nm, and/or 730 nm. For example, the beam of light emitted by the optical system comprises at least one wavelength of 620 nm-630 nm, 640 nm-660 nm, 450 nm-460 nm, 460 nm-470 nm, and 725-735 nm.

In some examples, light sources for emitting different wavelengths can be controllable individually. Thus, light intensity of different wavelengths can be adjusted individually.

In the description of the disclosure, the optical system produces a light beam having an FWHM angle of greater than about 120 degrees in one or more transverse directions, wherein the transverse direction refers to a direction perpendicular to the optical axis of the light beam. In some examples, the optical axis of the light beam is perpendicular to the light emitting surface of the optical system or parallel to the central axis of the optical system. In some examples, the optical axis of the light beam is substantially the same axis as the central axis of the optical system. It is understood that there are numerous transverse directions. In some example, the transverse direction and the optical axis are in substantially the same plane.

Reference is now made in detail to the exemplary examples of the disclosure, examples of which are illustrated in the accompanying drawings. Wherever possible, like numerals will be used throughout the drawings to refer to like and corresponding parts (elements) of the various drawings.

FIG. 1 shows an example of an optical system and a light beam emitted by the optical system. The optical system 10 can emit a light beam 14 having an FWHM angle α in a transverse direction 11. The FWHM angle α in the transverse direction 11 can be about one hundred thirty degrees (130°) to about one hundred forty degrees (140°) or any other angle between about one hundred twenty degrees (120°) and about one hundred fifty degrees (150°). The transverse direction 11 can be one of the transverse directions that are perpendicular to the optical axis 13 of the optical system 10.

In some examples, as shown in FIG. 1, the optical system 10 produces a light beam 14 having an FWHM angle α of greater than 120 degrees in a first transverse direction 11, and an FWHM angle β of less than 120 degrees in a second transverse direction 12. In at least one example, the optical system 10 can produce a light beam 14 having an FWHM angle β of less than 80 degrees in the second transverse direction 12. In other examples, the optical system 10 can produce a light beam 14 having an FWHM angle β of less than 50 degrees in the second transverse direction 12. The second transverse direction 12 can be substantially perpendicular to the first transverse direction 11. In other examples, the first transverse direction 11 can be perpendicular to the second transverse direction 12.

In some examples, the light beam 14 emitted from the optical system 10 can have an FWHM angle of greater than 120 degrees in all transverse directions. In this way, the light beam 14 can cover a large area so that the light beam can simultaneously illuminate a larger number of objects near the optical system 10. In at least one example, the optical system 10 can be operable to illuminate one or more plants.

In yet other examples, the light beam 14 emitted from the optical system can have an FWHM angle between 120 degrees and 160 degrees in one or more transverse directions.

In operation, a large number of objects (for example, plants) can be arranged in a substantially rectangular shaped layout, thus having one transverse plane extending greater than a perpendicularly orientated transverse plane. In at least one example, a first transverse plane 11 can extend in a substantially vertical direction, and greater than a second transverse plane 12 in a substantially horizontal direction. In other examples, a first transverse plane 11 can extend in a substantially horizontal direction, and greater than a second transverse plane 12 in a substantially vertical direction. In yet other examples, the first transverse plane 11 and the second transverse plane 12 can extend in any direction or orientation relative to each other. The optical system 10 can illuminate the objects from the top of the objects. The optical system 10 can be arranged such that the first transverse direction 11 along a longitudinal arrangement direction of the objects, which allows the light beam 14 to cover more than one objects. The optical system 10 can be arranged such that the second transverse direction 12 is perpendicular to the arrangement direction of the one or more objects, which makes the light beam 14 efficiently used in the second transverse direction 12. In some examples, the optical system 10 can illuminate two plants in the first transverse direction 11.

Figure 2A:
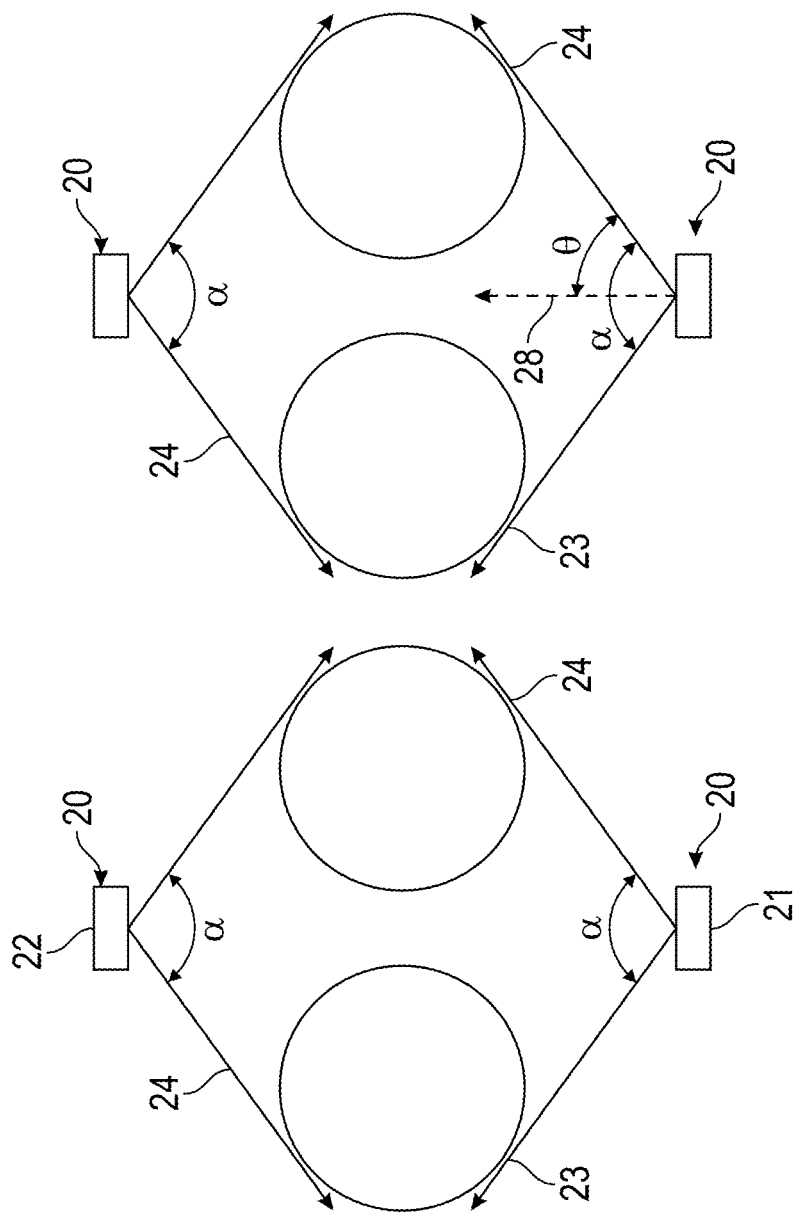
FIG. 2A is a top view of a plurality optical systems illuminating multiple objects according to at least one example of the present disclosure.

FIG. 2A is a top view of a plurality optical systems illuminating multiple objects according to at least one example of the present disclosure. Each of the one or more optical systems 20 can produce a light beam 24 operable to cover different lateral sides of an object 23. For example, two light beams from two optical systems 21 and 22, respectively, illuminate opposing sides of the object 23. In some example, a combined light beam from one or more optical systems can cover a lateral side of a plant.

The angle α the light beam 24 provided by each of the plurality of optical systems 20 can be greater than 120 degrees in at least one transverse direction. While FIG. 2A illustrates a top view showing a substantially vertically orientated transverse plane, it is within the scope of this disclosure to implement the optical system in any orientation and provide a light beam with an FWHM angle greater than 120 degrees relative to a transverse plane. For example, the optical system can provide illumination from the top of an object, the bottom of an object, or any angle therebetween.

With the multiple objects arranged in a lateral row, a lateral side of every two adjacent plants is illuminated by one optical system 21, and the opposite sides of the two plants are illuminated by another optical system 22. Each of the majority of plants is illuminated by four separate optical systems.

Figure 2B:
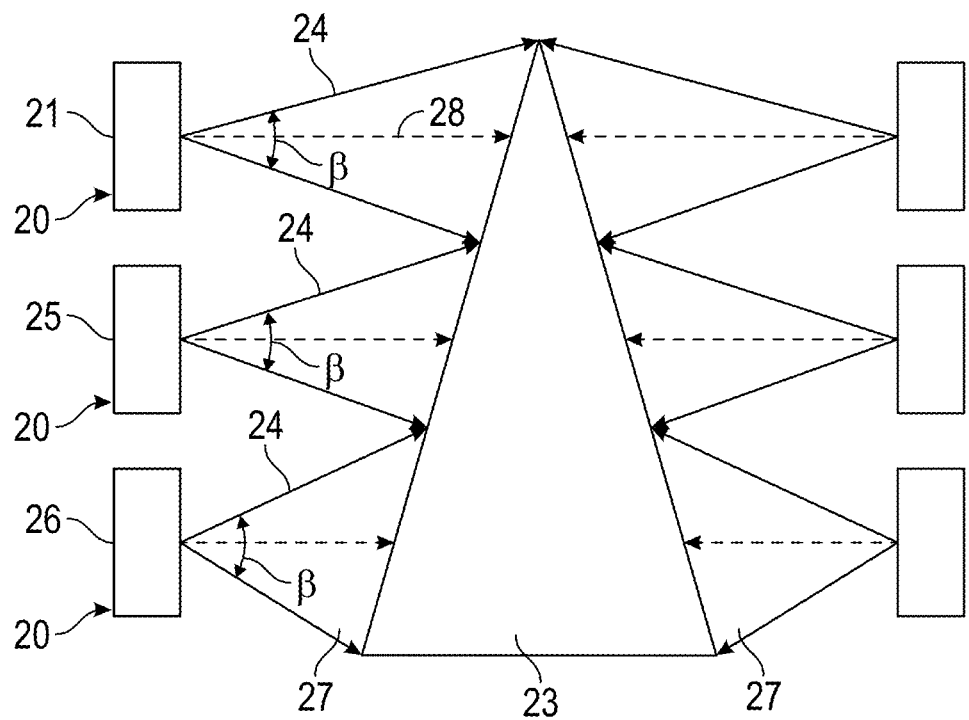
FIG. 2B is a side view of the plurality of optical systems in FIG. 2A.

In some examples, the highest optical system 20 in a vertical direction can be set at a height of about one-half to two times (0.5×-2×) the object height (shown more clearly in FIG. 2B). In at least one example, the highest optical system in a vertical direction can be set at a height of 1.2 times the object height. In some examples, the optical axis 28 of each optical system 20 lies between the two laterally adjacent objects. The distance between an optical system 20 and the center of each of the two laterally adjacent objects can be about one to two (1-2) times the object radius. In at least one example, the distance between each optical system and the center of each of the two plants can be set as approximately 1.4 times the plant radius.

In some examples, each optical system 20 can be arranged such that the first transverse direction parallel to the horizontal direction, which makes the light beam from each optical system covering lateral sides of one or more objects 23 (for example, two plants in FIG. 2A). In some examples, the optical axes 28 of the one or more optical systems 20 (shown in FIG. 2B) can be not parallel to a horizontal direction.

While FIG. 2A illustrates four objects 23 illuminated on each lateral side by two optical systems 20, it is within the scope of this disclosure to include any number of objects 23 in a lateral direction illuminated by any number of optical systems 20 in the lateral direction. For example, there can be six, eight, ten, fourteen, or any number of objects 23 in a lateral direction illuminated by two, four, five, six, eight, twenty or any number of optical systems 20. Further, while FIG. 2A illustrates each optical system 20 illuminating two objects 23, it is within the scope of this disclosure to illuminate any number of objects 23 with each optical system 23 including, but not limited to, one, three, four, five, six, etc. objects illuminated by each optical system 23.

FIG. 2B is a side view of the plurality of optical systems in FIG. 2A. One or more optical systems are disposed in a vertical direction, thus illuminating a lateral side of an object 23. For example, in FIG. 2B, optical systems 21, 25, and 26 are disposed in a vertical orientation to illuminate a lateral side 27 of an object 23. The one or more optical systems 20 can individually produce a light beam 24 having an FWHM angle β of less than about 80 degrees. The optical axis 28 of the one or more optical systems 20 can be substantially parallel to a horizontal direction.

Figure 2C:
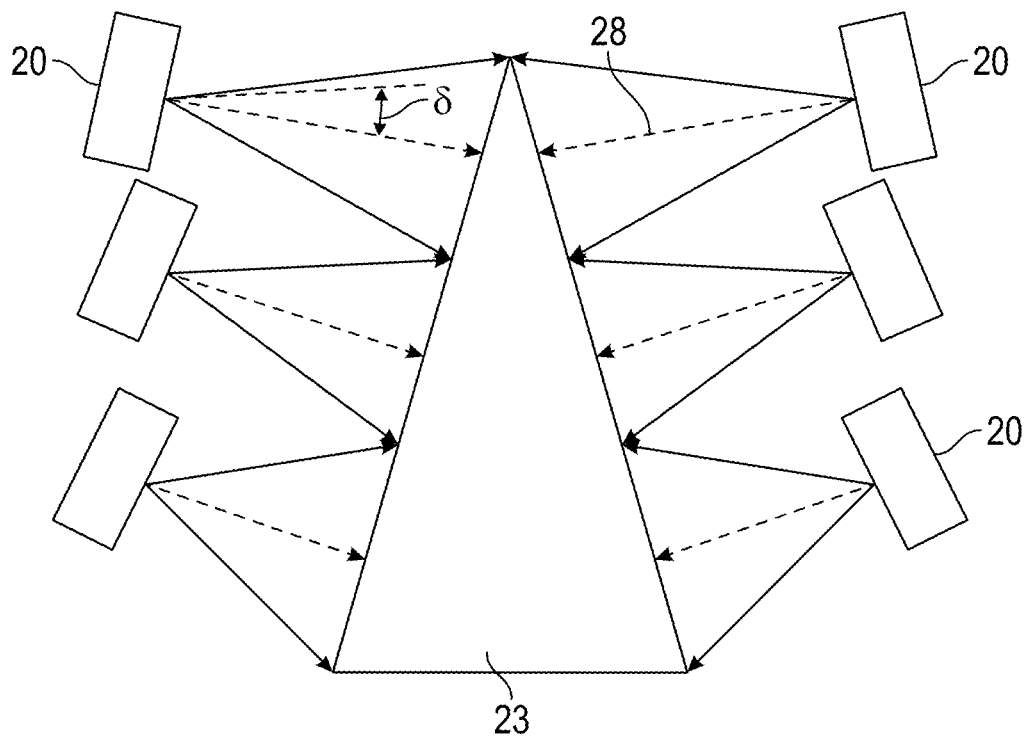
FIG. 2C is a side diagrammatic view of a plurality of optical systems illuminating an object with the plurality of optical systems having an optical axis deviating from horizontal according to at least one example of the present disclosure.

FIG. 2C is a side view of a plurality of optical systems illuminating an object with the plurality of optical systems having an optical axis deviating from horizontal according to at least one example of the present disclosure. The one or more optical systems 20 can be arranged such that the one or more optical axes 28 forms an angle δ with a horizontal axis 29 (shown more clearly in FIG. 2D). The one or more optical systems 20 can illuminate one or more objects 23 in an oblique vertical direction. The angle δ formed by the optical axis 28 and the horizontal axis 29 can be either a positive or negative inclination angle. For example, angle δ can be formed above or below the horizontal axis 29.

Figure 2D:
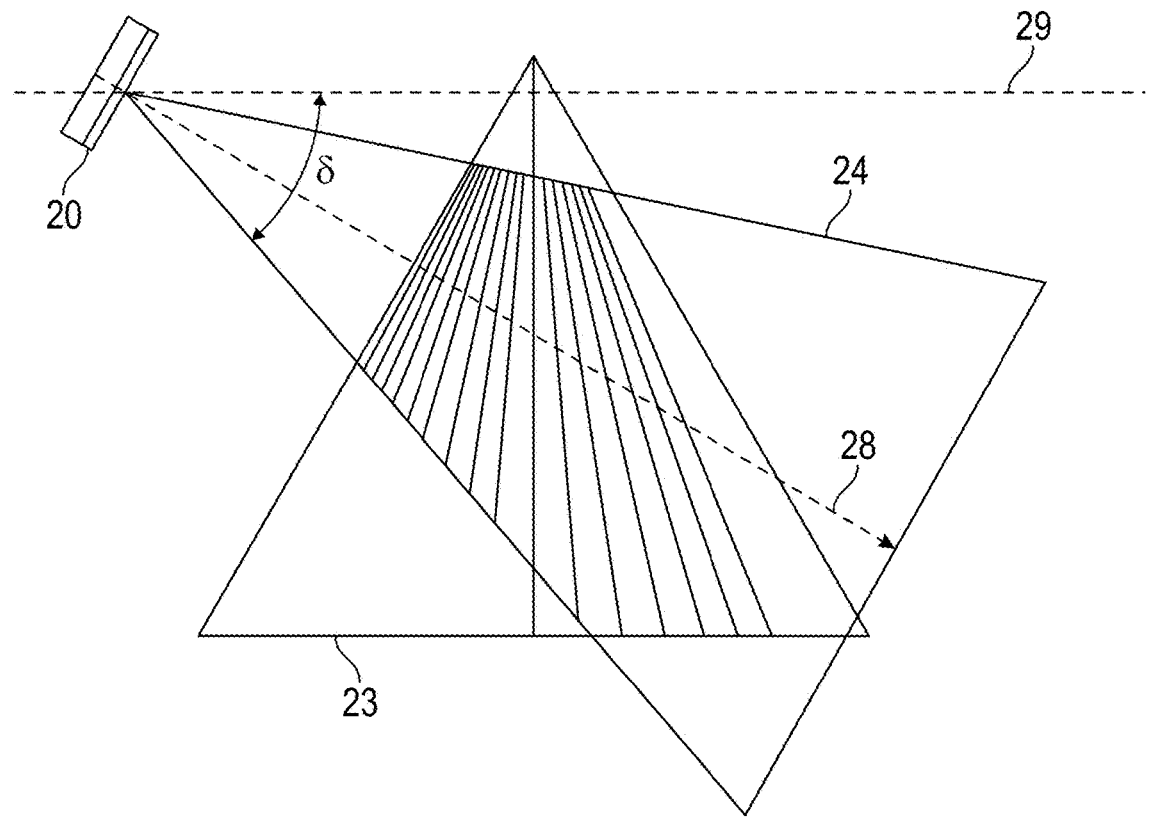
FIG. 2D is a diagrammatic side view of an optical system illuminating an object at an angle relative to a horizontal axis according to at least one example of the present disclosure.

FIG. 2D shows a side view of an optical system illuminating an object at an angle relative to a horizontal axis. The optical system 20 can be angled to produce a light beam 24 having an optical axis 28 at angle δ relative to the horizontal axis 29. The optical system 20 can be angled downward to provide an increase illumination on the object 23. In at least one example, the optical system 20 can be configured to illuminate a plant and the optical system can be angled downward at an angle δ determined by the particular plant being illuminated. The angle δ can be varied by the leaf structure, growth rate, growth pattern, and/or any other factor of the particular plant being illuminated.

While FIG. 2D illustrates angle δ as a negative, or downward, orientation, it is within the scope of the present disclosure to implement an optical system 20 having a positive angle δ relative to the horizontal axis 29, thus having the optical system 20 angled upward relative to the horizontal axis 29.

Figure 2E:
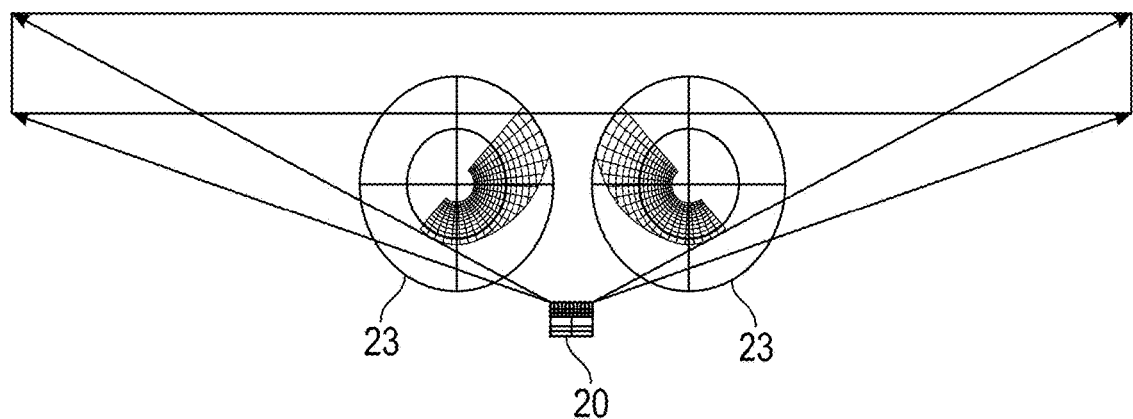
FIG. 2E is a top view of an optical system illuminating two objects according to at least one example of the present disclosure.

FIG. 2E shows a top view of the optical system 30 illuminating two objects 23. The optical systems 20 can be arranged such that the optical axis 28 has an angle δ with the horizontal direction 29 (shown in FIG. 2D). The optical system 20 can illuminate the objects 23 in an oblique vertical direction. The illuminating angle (angle δ) between the optical axis of each optical system 20 and the horizontal axis 29 can be between about 10 degrees to 60 degrees. Different optical systems 20 can or cannot have the same illuminating angle, including within a single illumination arrangement.

In some examples, the optical system 20 is configured to illuminate one or more objects 23 with the optical axis 28 facing down and having an angle δ greater than 10 degrees with respect to the horizontal direction. The angle δ with respect to the horizontal axis 29 can be greater than half of the FWHM angle in the second transverse direction (for example, angle β in FIG. 1). The light beam can illuminate the object(s) 23 obliquely vertically, which is conducive to improving the utilization of the light beam 24.

In some examples, each optical system 20 can be adjustable to change the direction of optical axis 28 in the vertical direction, such that angle δ can be independently adjustable for each optical system 20. Thus, the user can adjust the direction of the optical system 20 to adapt to different heights of objects (for example, growing plants), and can also adjust the vertical spacing between two adjacent light spots to generate a uniform light distribution. In some examples, the angle δ between the optical axis 28 of each optical system 20 and the horizontal axis 29 can be adjusted to an angle between approximately 10 degrees to 60 degrees.

A light spot on a projection surface illuminated by the light beam emitted from the optical system can be of any shape. In some examples, the light spot on the projection surface is a regular pattern or an irregular pattern. For example, the projection surface can be a plane, and the light spot on the plane can be polygonal, circular, elliptical and/or rectangular in shape. The projection surface can be a curved surface. For example, the projection surface can be a surface of a plant (for example, the objects in FIG. 2E). The object 23 cancan have a spherical body, cylindrical body, a circular truncated frustoconical body, and/or a conical body. In some examples, the conical body can have a cone angle between about 20 degrees and about 70 degrees. The light spot described in the present disclosure can be produced by the optical system illuminating the plant from above, from the side, and/or at any angle therebetween.

The light intensity distribution of the light beam 24 can be of any pattern. The optical power density distribution pattern of the light spot illuminated by the light beam on a projection surface can be of any pattern.

Figure 3A:
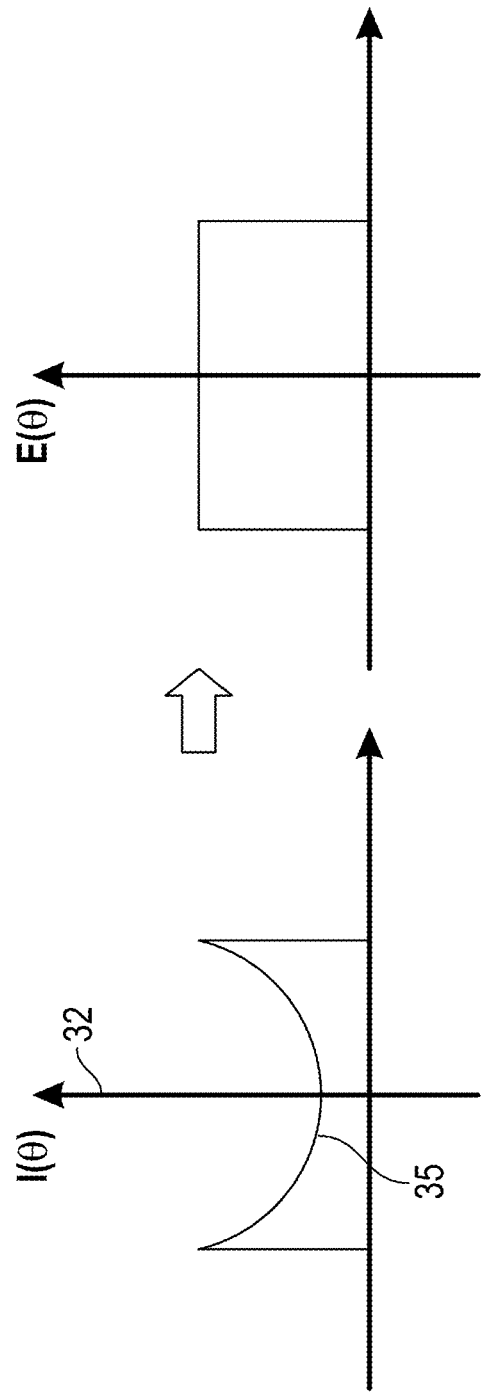
FIG. 3A is a light intensity distribution pattern and optical power density distribution pattern in one or more transverse directions according to at least one example of the present disclosure.

FIG. 3A shows an example of a light intensity distribution pattern and optical power density distribution pattern in one or more transverse directions. The light spot on a projection surface (shown more clearly in FIG. 5D and FIG. 5E) has a substantially uniform distribution of optical power density in the one or more transverse directions.

A substantially uniform distribution of optical power density in a certain illuminated area in the present disclosure means that the maximum optical power density is less than 10 times (or less than 5 times) the minimum optical power density in the illuminated area.

The relationship between optical power density E in a light spot illuminated by a light source formed in a projection plane and light intensity I is: $E(\theta)=I(\theta)*\cos^3(\theta)/L^2$, where θ is an angle to the optical axis, L is a distance between the light spot and the light source, wherein the projection plane is any plane at a distance from the optical system. According to the relationship between optical power density E and light intensity I, in order to generate a light spot having substantially uniform optical power density, the light intensity at the optical axis forms a substantially trough shape 35 in the light intensity distribution 30 of the light beam in the one or more transverse directions. In one or more transverse directions, the light intensity I can increase from the center to the periphery. In at least one example, in all transverse directions the light intensity can increase from the center to the periphery.

In some examples, the distribution of the light intensity of the light beam I(θ) is substantially equal to $$\frac{I_0}{\cos^3(\theta)}$$

in one or more transverse directions, where $I_0$ is the light intensity of light at the optical axis, and I (θ) is the light intensity of light having an angle θ to the optical axis. The distribution of the light intensity makes a substantially uniform distribution of optical power density on the spot illuminated by the light beam in a projection plane at a distance from the optical system. A uniform distribution of optical power density on the spot along the one or more transverse directions can promote similar growth rates at different locations of plants.

In some examples, the optical power density of the light beam on one or more circles centering on the optical axis is substantially uniform. In some examples, the optical power density of the whole light beam spot is substantially uniform.

In some examples, the distribution of optical power density on the whole light spot is substantially uniform. In some examples, the distribution of optical power density on a certain area of the light spot is substantially uniform. In at least one example, the certain area is located around the optical axis.

Figure 3B:
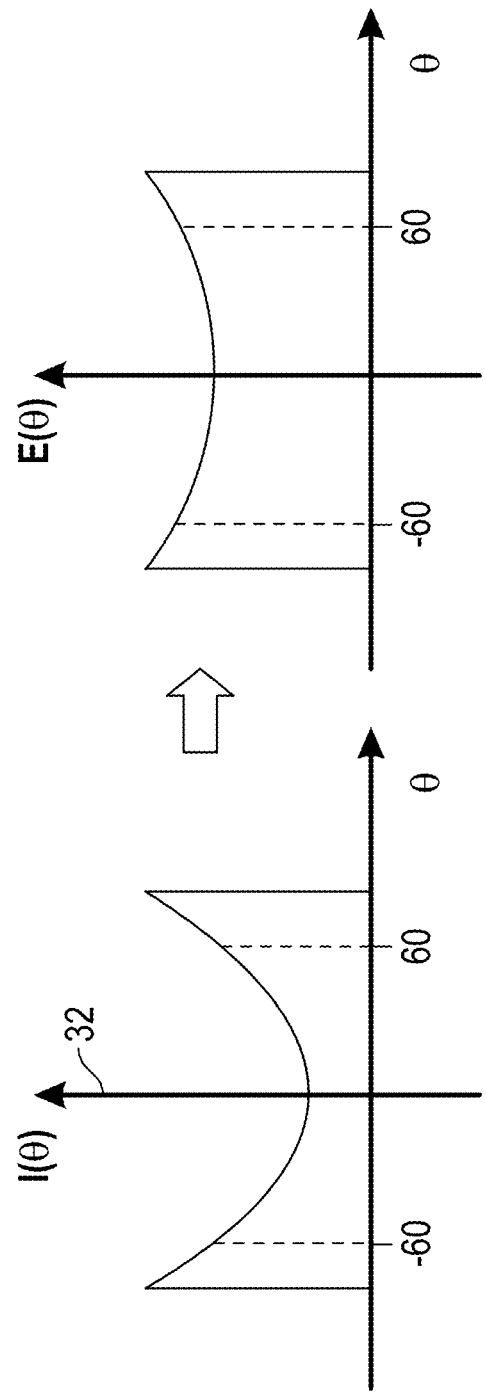
FIG. 3B is a light intensity distribution pattern and an optical power density distribution pattern in a transverse direction according to another example of the present disclosure.

FIG. 3B shows another example of a light intensity distribution pattern and an optical power density distribution pattern in a transverse direction according to at least one example of the present disclosure. In a light spot illuminated by the light beam on a projection plane, the average optical power density on a center section around the optical axis can be less than the average optical power density on an edge section of the light spot in one or more transverse directions. The average optical power density is equal to the total optical power of the certain section divided by the area of the section. In the one or more transverse directions, the optical power density of light spot can increase from the center to the periphery.

In some examples, the shape of the light spot is circular, elliptical, close to circular and/or close to elliptical. The light spot comprises a first region and a second region surrounding the first region. The optical power density on the first region is not greater than the optical power density on the second region. In some examples, the optical power density in the first area and/or the second area is substantially uniform. In some examples, the optical power density on the first area and/or the second area increases from the center to the periphery. The first region can be located around the optical axis and/or has a distance from the optical axis.

In some examples, the shape of the light spot is rectangular or substantially similar to rectangular. The light spot comprises a first region, a second region and a third region which of both are located respectively at two sides of the first region. For example, the second region, the first region and the third region are three strip-shaped regions in the light spot. The optical power density on the second region and the third region is not less than the optical power density on the first region. Optionally, the optical power density on the second region is similar to the optical power density on the third region. In some examples, the first region is located around the optical axis.

In some examples, the optical power density in the second region and/or the third region is substantially uniform. In some examples, the optical power density on the second region and/or the third region can increase from one side close to the first region to the other side. In some examples, the optical power density on the second region and/or the third region can decrease from one side close to the first region to the other side. In some examples, the optical power density on the second and third regions increases from the center to both sides.

As FIG. 3B shows, in a transverse direction, a light intensity trough 38 occurs around the optical axis in the light intensity distribution, and the light intensity increases as the angle to the optical axis increases.

Optical systems with light intensity described above can be used to illuminate one plant from just above or from lateral side of the plant, with the optical axis of the optical system substantially going through the middle of the plant. The first region mentioned above can be configured to cover the center of the plant. The illuminated area on the plant at the optical axis is closest to the optical system. If the optical power density on this area is higher than optical power density on other regions, it would result in the fastest growth of the leaves located directly under the optical system to block the light emitted from the light source. The light intensity distribution in this example can avoid this problem.

Figure 4:
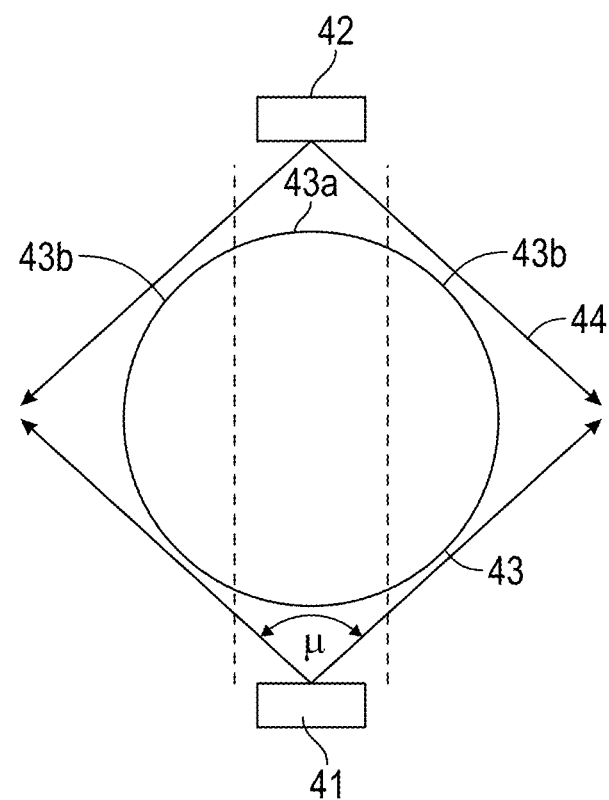
FIG. 4 is a top view of two optical systems illuminating an object according to at least one example of the present disclosure.

FIG. 4 is a top view of two optical systems illuminating from opposing sides. The light beams 44 produced by the two optical systems 41 and 42 each has an FWHM angle μ of greater than one hundred twenty degrees (120°) in the horizontal transverse direction, and covers two opposing sides of an object 43. In at least some examples, in the light spot illuminated by one light beam on the plant, the first region covers a middle region 43a of the object 43. The second region and the third region of the object 23 respectively cover the edge regions 43b of the object 34 on either side of the middle region 43a. In at least one example, the light received by leaves of a plant object 43 in the middle region 43a and closest to the optical system 40 can be weakened, so as to prevent the leaves from growing too fast and blocking the light beam 44 emitted by the optical system 40. The optical power density on the second region 43b and the third region 43b can be substantially uniform, so that the leaves located on both edge sides have a similar growth rate.

In some examples, the light spot illuminated by the light beam on a projection plane comprises two or more illuminated areas, wherein each illuminated area illuminates one object 43.

Figure 5A:
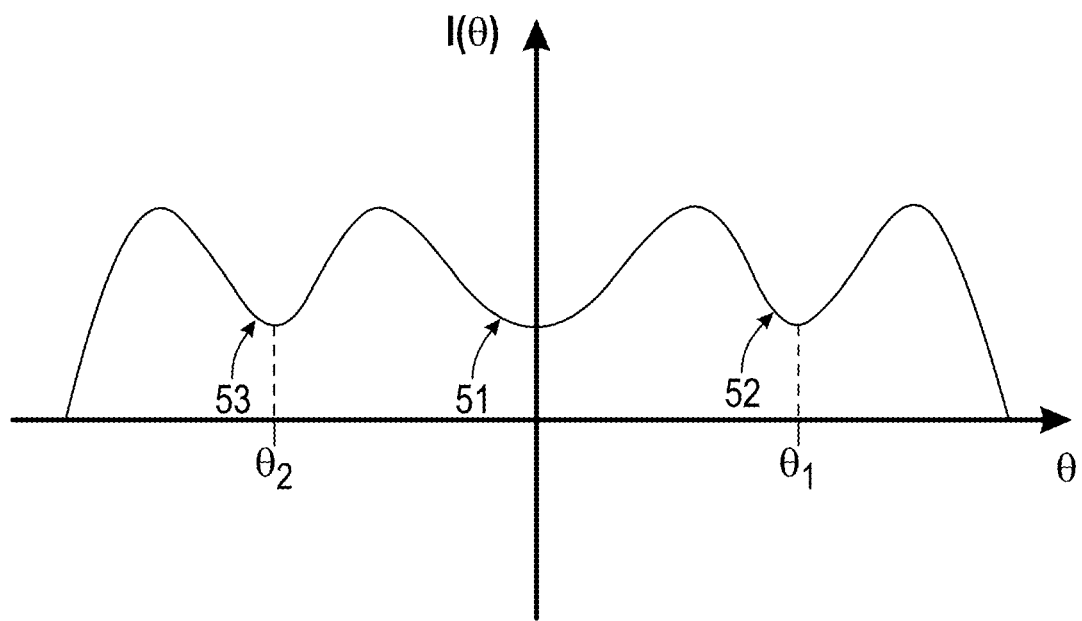
FIG. 5A is a light intensity distribution pattern in one or more transverse directions according to yet another example of the present disclosure.

FIG. 5A shows another example of a light intensity distribution pattern in one or more transverse directions. The light intensity distribution pattern of the light beam in the one or more transverse directions can have an oscillating shape. The light intensity distribution can have two or more troughs. In this example, the light intensity distribution has three troughs, a first trough 51 located around the optical axis, a second trough 52 located at a longitudinal direction having an angle $\theta_1$ with respect to the optical axis, and a third trough 53 located at a longitudinal direction having an angle $\theta_2$ with respect to the optical axis. The angle $\theta_1$ can equal to the angle $\theta_2$. The troughs can be disposed between one or more peaks.

An optical system with light intensity described in FIG. 5A can be used to illuminate one or more objects (for example, one or more plants) from above and/or from one or more lateral sides of the one or more objects. In some examples, the light spot illuminated by the light beam on a projection plane comprises four illuminated areas, and the optical system is configured to illuminate four objects. In the light spot illuminated by optical system, each trough can be located at a gap area between two adjacent objects, and each peak located at one object.

In some examples, the light spot illuminated by the light beam in FIG. 5A on a projection plane comprises two illuminated areas, and the optical system is configured to illuminate two plants. In the light spot illuminated by the optical system, the first trough 51 is located at a gap between two adjacent illuminated areas. The second trough 52 is located at the center of one illuminated area, and the third trough 53 is located at the center of the other illuminated area.

Figure 5B:
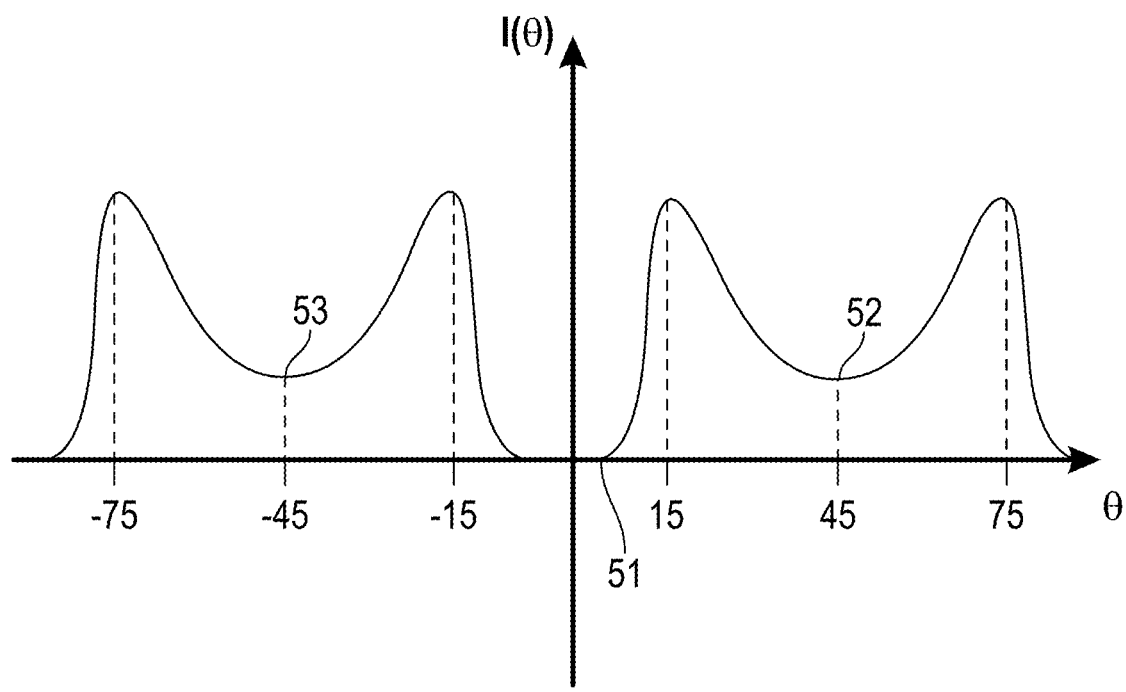
FIG. 5B is another example light intensity distribution pattern in one or more transverse directions according to the present disclosure.

In some examples, different troughs can have different light intensity values. FIG. 5B shows another example of a light intensity distribution pattern in one or more transverse directions. A trough 51 located between two adjacent illuminated areas can be lower than the other two troughs 52, 53. The trough located between two adjacent illuminated areas can be lower than 0.5 times any of the other two troughs.

An optical system with light intensity described in FIG. 5B can be used to illuminate one or more objects (for example, plants) from above or from one or more lateral sides of the one or more objects. In some examples, the light spot illuminated by the light beam in FIG. 5B on a projection plane comprises two illuminated areas, and the optical system is configured to illuminate two objects, as is shown in FIG. 2A-2D.

Figure 5C:
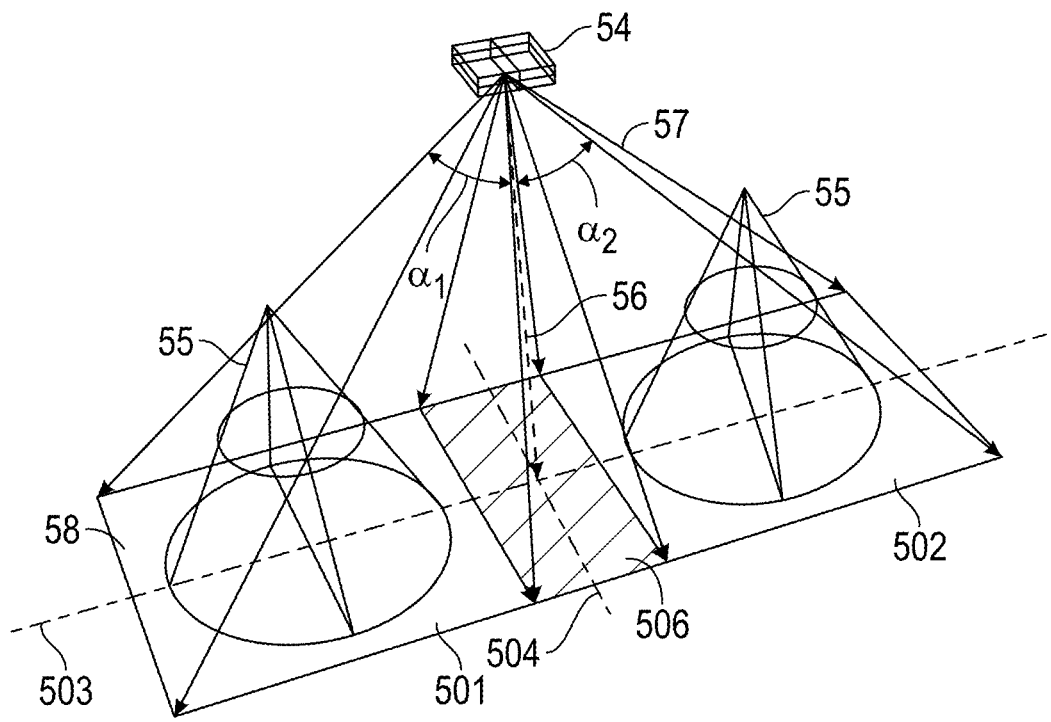
FIG. 5C is an optical systems illuminating two objects from above according to at least one example of the present disclosure.

FIG. 5C shows another example of an optical systems illuminating two objects from above. The light spot illuminated by the light beam 57 from an optical system 54 on a projection plane 58 comprises a first illuminated area 501 and a second illuminated area 502, wherein each illuminated area illuminating one plant 55. The centers of the two illuminated areas 501 and 502 are respectively located on two sides of the optical axis 56. The center of the first illuminated area makes an angle α1 relative to the optical axis. The center of the second illuminated area makes an angle α2 relative to the optical axis. Optionally, α1 can be substantially the same as α2.

In some examples, the ratio of the light energy in the angle range corresponding to the gap area 506 between the two illuminated areas 501, 502 to the total energy of the light beam 57 does not exceed 20%. In at least one example, the light energy in this angle range is substantially zero. In at least one example, this angle range is a range of less than 15 degrees relative to the optical axis 56.

In at least one example, each of the illuminated areas 501, 502 is respectively located on both sides of the optical axis 56 and is symmetrical about the optical axis 56. In an example, the corresponding angle range of each illuminated area is from about 15 degrees to about 75 degrees with respect to the optical axis, and the center of each illuminated area makes an angle of about 45 degrees relative to the optical axis.

Figure 5D:
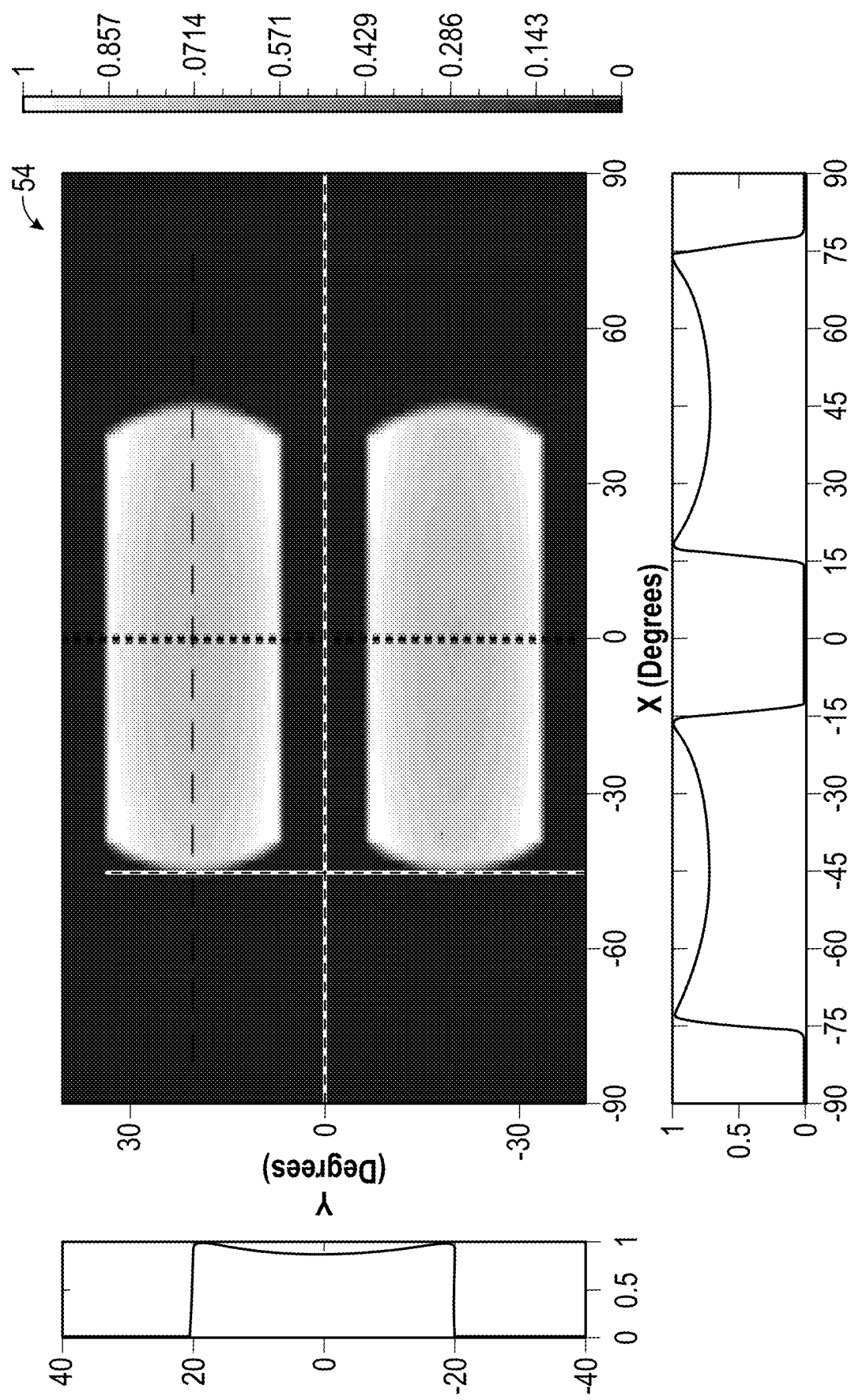
FIG. 5D is a light intensity distribution pattern of optical system in FIG. 5C and/or in FIG. 2A-D.

FIG. 5D shows an example of a light intensity distribution pattern of optical system in FIG. 5C and/or in FIG. 2A-2D. The optical system 54 can have an FWHM angle about 150 degrees in a first transverse direction (for example, transverse direction 503 in FIG. 5C), and can have an FWHM angle about 40 degrees in a second transverse direction (for example, transverse direction 504 in FIG. 5C or the vertical direction in FIG. 2A-2D) perpendicular to the first transverse direction. The light intensity increases from a direction pointing to the center of each illuminated area to the periphery in the first transverse direction and the second transverse direction.

Figure 5E:
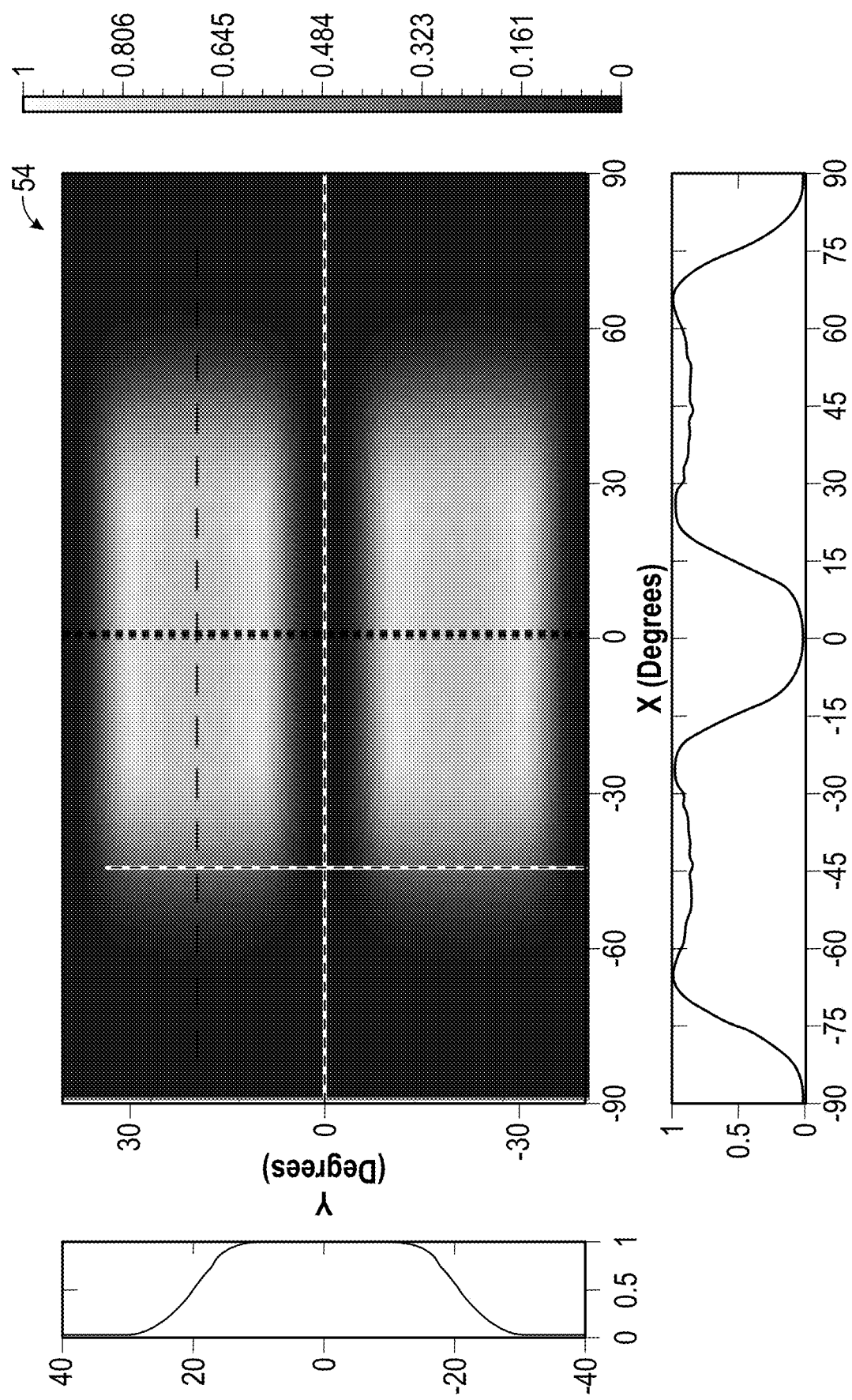
FIG. 5E is a realized example of a light intensity distribution pattern of optical system according to at least one example of the present disclosure.

FIG. 5D is an idealized light intensity distribution of optical system. FIG. 5E shows a realistic example of a light intensity distribution pattern of optical system. The rising and falling edges in the light intensity distribution pattern are slower comparing to the light intensity distribution pattern in FIG. 5D.

The light intensity distribution and/or the optical power density distribution described above take the light beam from the optical system as example. In some examples, the light intensity distribution and/or the optical power density distribution described above can also be the light intensity distribution and/or the optical power density distribution of light of any wavelength from the optical system. In some examples, the light intensity distribution and/or the optical power density distribution described above can also be the light intensity distribution and/or the optical power density distribution of light of any light source in the optical system.

In some examples, optical axis of light beam from each light source (for example, LED) in the optical system are parallel to each other, and parallel to the optical axis of the optical system. In some examples, the optical system includes a first LED array and a second LED array. The light beam from the optical system comprises the light beam from the first LED array and the light beam from the second LED array. Optical axes of LEDs in the first LED array are substantially parallel to each other. Optical axes of LEDs in the second LED array are substantially parallel to each other. Optical axis of the first LED array and optical axis of the second LED array have an angle with each other. Optionally, the optical axis of the first LED array and the optical axis of the second LED array make an angle of about twenty (20) degrees (°) to about one hundred twenty (120) degrees (°) between each other. Optionally, both of the optical axes of the first and second LED array have a certain angle relative to the optical axis of the optical system. Optionally, the certain angle ranges from about ten (10) degrees (°) to about sixty (60) degrees (°). In some application scenarios, the first LED array is used to illuminate one plant and the second LED array is used to illuminate another plant.

In some examples, the light intensity distribution and/or the optical power density distribution described above can also be the light intensity distribution and/or the optical power density distribution of light of any LED array in the optical system.

In some examples, the light intensity distribution and/or the optical power density distribution of light of any LED array or any light source in the optical system can be different from the light intensity distribution and/or the optical power density distribution described above. For example, the light beam from any LED array or any light source can have an FWHM angle of less than 120 degrees in some transverse directions or in all transverse directions. However, the light beam from all LED array or all light sources are combined to a light beam having the light intensity distribution and/or the optical power density distribution described above.

The optical system of the present disclosure has a variety of configurations. For example, the optical system can be created using light-emitting diodes (LEDs) with lenses, shaped substrate LEDs, or shaped emitter layer LEDs with overlapping optical power density patterns. In some examples, each lens, shaped substrate or shaped emitter layer in the optical system can be configured to emit light with a high light efficiency. Furthermore, each lens, shaped substrate or shaped emitter layer in an optical system can be shaped to create a light distribution pattern of any kind. It is understood that LED can be replaced by other light sources.

The lens output surface can have kinds of shape. In some examples, the lens output surface is a surface of revolution formed by rotating the lens profiles in the figures described below about a rotational symmetry axis, wherein the rotational symmetry axis is parallel to the optical axis of the LED. Thus, the light spots illuminated by the LEDs in these examples are circular, elliptical, close to circular or similar to elliptical.

In some examples, the lens output surface is a surface of translation formed by partially panning the lens profiles in the figures described below respectively along a symmetry axis perpendicular to the optical axis of the LEDs. Thus, the light spots illuminated by the LED are rectangular or similar to rectangular.

In some examples, the lens output surface is a free-form surface, and the lens profiles in the figures described below are different examples of one profile belonging to the multiple profiles of the lens.

Figure 6:
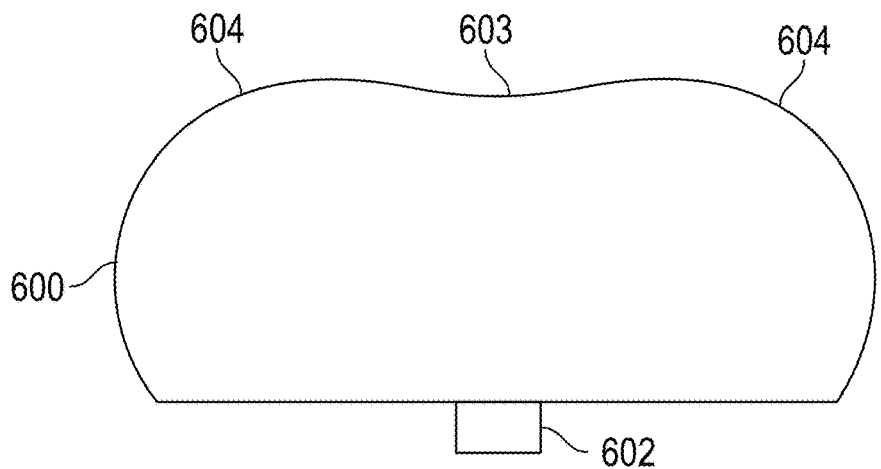
FIG. 6 is a cross-sectional view of a lens profile and a LED profile according to at least one example of the present disclosure.

FIG. 6 shows a cross-sectional view of a lens profile 600 and a LED profile 602. The lens profile 600 has a substantially concave section 603 at the optical axis of the LED, and has two substantially convex sections 604 located at two opposite sides of the concave section 603. In order to provide much higher light intensity at greater angles, the lens 600 both reduces the intensity at small angles and increases the intensity at large angles. The concave central section 603 diverges the LED small-angle rays to relatively larger-angle exit rays, and the two convex outer sections 604 converge the LED rays close to 90 degrees to relatively smaller-angle exit rays.

In some examples, a transparent material can be filled between the LED's emitting surface and the lens to eliminate the air gap, which can reduce the Fresnel loss of light at the air-lens interface and at the air-LED interface. The transparent material can be silica gel, inorganic gel and/or some other materials having a refractive index greater than 1.4.

Figure 7:
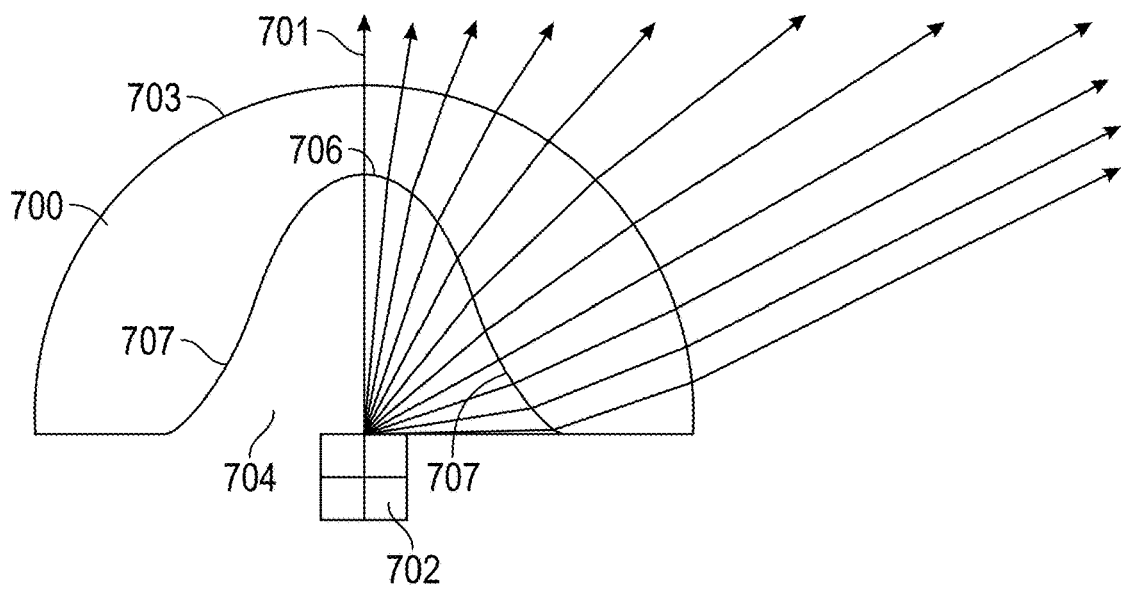
FIG. 7 is a cross-sectional view of another lens profile and LED profile according to at least one example of the present disclosure.

FIG. 7 shows a cross-sectional view of another lens profile 700 and LED profile 702. The side opposite to the light exit surface 703 of the lens 700 includes a dome cavity 704, and the surface of the dome cavity 704 forms the lens entrance surface. The lens entrance surface has a substantially concave section 706 at the optical axis 701 of the LED, and has two substantially convex sections 707 located at both sides of the concave section 706.

Rays emitted from the LED are shaped by the lens. In order to provide much higher light intensity at greater angles, the lens both reduces the intensity at small angles and increases the intensity at large angles. The concave central section diverges the LED small-angle rays to relatively larger-angle exit rays, and the convex outer sections converge the LED rays close to 90 degrees to relatively smaller-angle exit rays.

A primary optics element can be further disposed between LED and the lens. The primary optics element can be a refraction lens, a total internal reflection (TIR) lens, a hollow CPC, a solid CPC, or a reflector. The primary optics element can improve light output efficiency of the LED, and converge the light emitting angle of the LED. Optionally, the light entrance surface of the lens can include a dome cavity that fits over the primary optics element.

Figure 8:
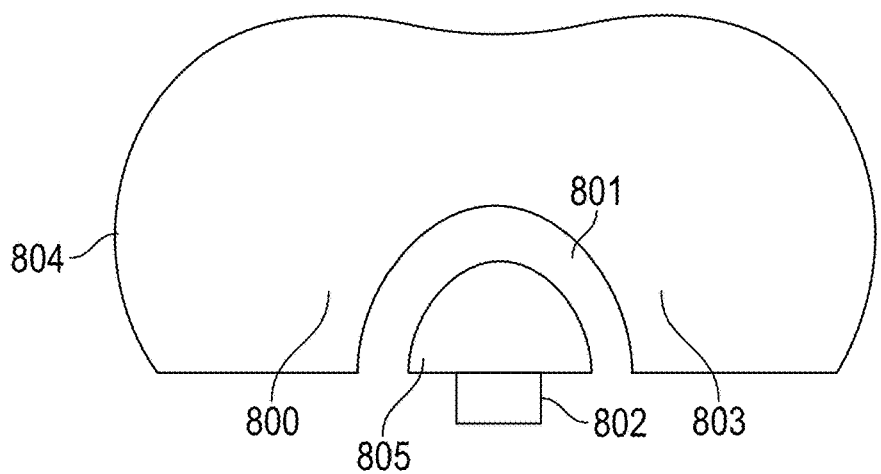
FIG. 8 is a cross-sectional view of another lens profile, the primary optics element profile and LED profile according to at least one example of the present disclosure.

FIG. 8 shows a cross-sectional view of another lens profile 800, the primary optics element profile 805 and LED profile 802. The lens has a light entrance surface 803 opposite to a light exit surface 804. The light entrance surface 803 can include a dome cavity 801 that fits over the primary optics element. Likewise, a transparent material can be filled between the primary optics element and the lens. In FIG. 7, the primary optics element can be disposed in the dome cavity 704.

Figure 9:
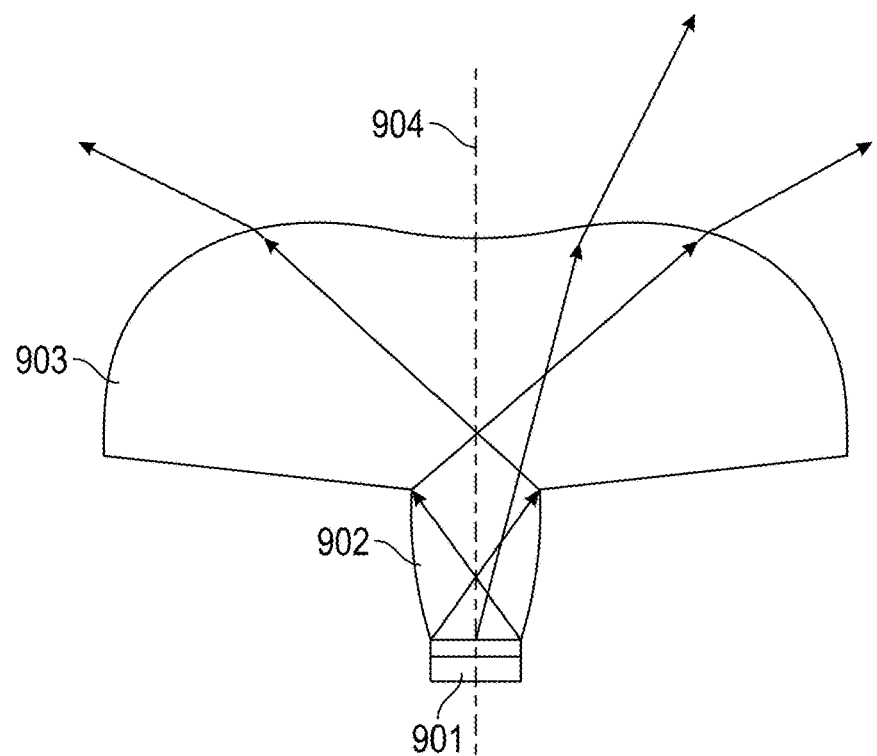
FIG. 9 is a cross-sectional view of another lens profile, the primary optics element profile and LED profile according to another example of the present disclosure.

FIG. 9 shows a cross-sectional view of another lens profile 903, the primary optics element profile 902 and LED profile 901. The primary optics element disposed between LED and the lens is a CPC. In some examples, the CPC sidewall is a side wall of revolution formed by partially rotating the primary optics element profile 902 about a rotational symmetry axis, wherein the rotational symmetry axis is parallel to the optical axis of the LED 901. In some examples, the CPC sidewall is a side wall of translation formed by partially panning the primary optics element profile 902 about a symmetry axis, wherein the symmetry axis is perpendicular to the optical axis 904 of the LED 901. The CPC is configured to collect the large-angle light emitted by the LED to form a light beam with a small angle. The outgoing beam from CPC is further shaped by the lens 903. The CPC can or cannot be removably connected to the lens.

Figure 10:
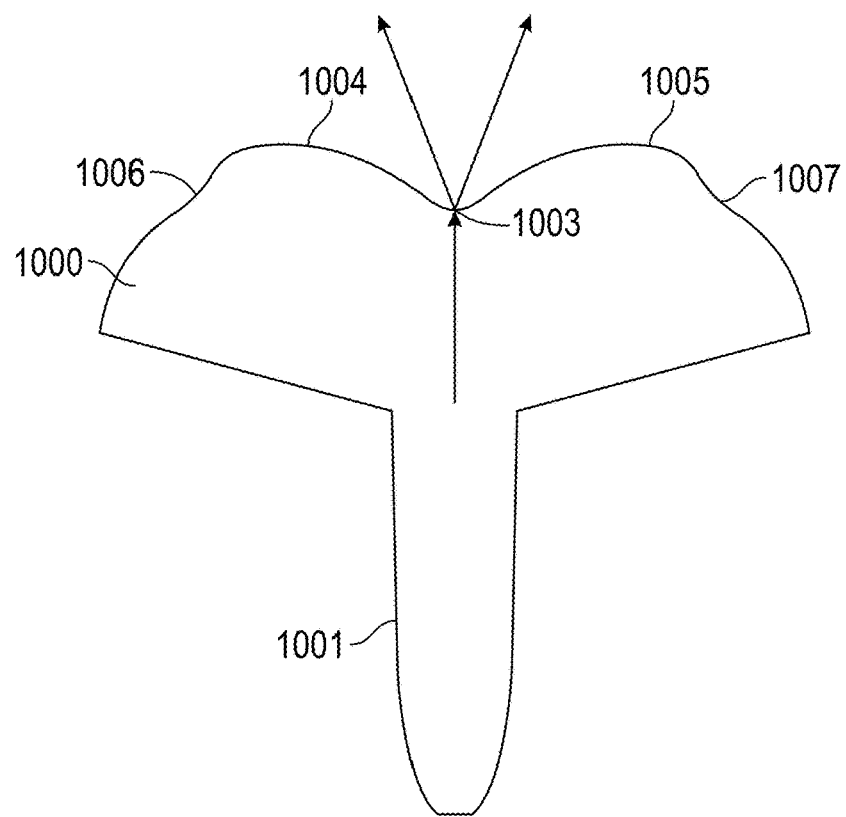
FIG. 10 is a cross-sectional view of another lens profile and the primary optics element profile according to at least one example of the present disclosure.

FIG. 10 shows a cross-sectional view of another lens profile 1000 and the primary optics element profile 1001. The primary optics element 1001 is a CPC. In some examples, the lens output surface is a surface of revolution formed by rotating the profile 1000 about a rotational symmetry axis, wherein the rotational symmetry axis is parallel to the optical axis of the LED.

The lens profile 100 has one or more cusps 1003. Each cusp 1003 will cause the light incident on the cusp 1003 to deflect to two opposite sides of the cusp 1003, forming a low light intensity in the direction of the cusp. In some examples, the lens profile can have three cusp, the first cusp is located at the optical axis of the LED, and the other two are located at two opposite sides of the first cusp, having a certain angle with the optical axis of the LED. The cusp can be an intersection of a generally concave section and a generally convex section on the profile 1000, or can be an intersection of a generally concave section and a generally concave section on the profile 1000, or can be an intersection of a generally convex section and generally a convex section on the profile 1000.

In FIG. 10, the lens profile 1001 has a cusp 1003 at the optical axis of the LED. The cusp 1003 is an intersection of a generally convex section 1004 and a generally convex section 1005. Optionally, the lens profile 1001 further has a concave section 1006 at a first direction having a first angle to the optical axis of the LED, and has a concave section 1007 at a second direction having a second angle to the optical axis of the LED. Each concaves section is located between two convex sections. This would cause a lower light intensity in the first direction and the second direction.

FIG. 5B can be an example of a light intensity distribution pattern of light emitted from lens of FIG. 10 in the transverse directions that the lens profile 1001 lies. Rays emitted from the LED incident on the concave sections and the cusp 1003 are diverged, and rays emitted from the LED incident on the convex sections are converged. Light intensity troughs occur respectively around the first direction, the second direction and the optical axis of the LED. Light intensity crests occur around the directions of the convex sections. In a specific example, the first direction has a −45 degrees angle with the optical axis of the LED, the second direction has a 45 degrees angle with the optical axis of the LED.

Figure 11:
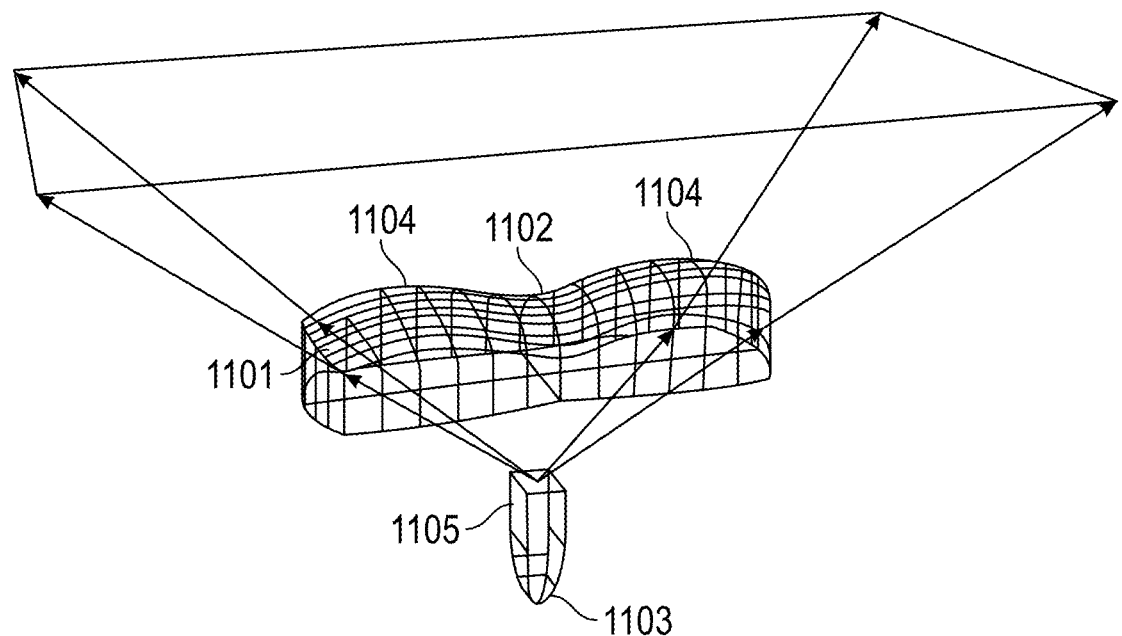
FIG. 11 is an isometric view of an example of a LED, a primary optics element and a lens according to at least one example of the present disclosure.

FIG. 11 shows an example of a LED 1103, a primary optics element 1105 and a lens. In some example, the lens exit surface 1101 is a surface of translation formed by partially panning the profile 600 of lens in FIG. 6 along a symmetry axis, wherein the symmetry axis is perpendicular to the optical axis of the LED 1103. In some examples, the lens exit surface 1101 is a free-formed surface.

The lens exit surface has a concave section 1102 at the optical axis of the LED, and has two convex sections 1104 located on two opposite sides of the concave section 1102 respectively. Rays emitted from the LED are shaped by the lens. In order to provide much higher light intensity at greater angles, the lens both reduces the intensity at the concave section and increases the intensity at the convex section.

In FIG. 11, The primary optics element 1105 is a CPC. The CPC can be square, or has other shapes. The CPC can emit a light beam having different divergence angles in different transverse directions. In some examples, the light beam emitted from the CPC has a first angle in a first transverse direction, and has a second angle in a second transverse direction, wherein the first angle is less than 0.8 times the second angle.

Figure 12:
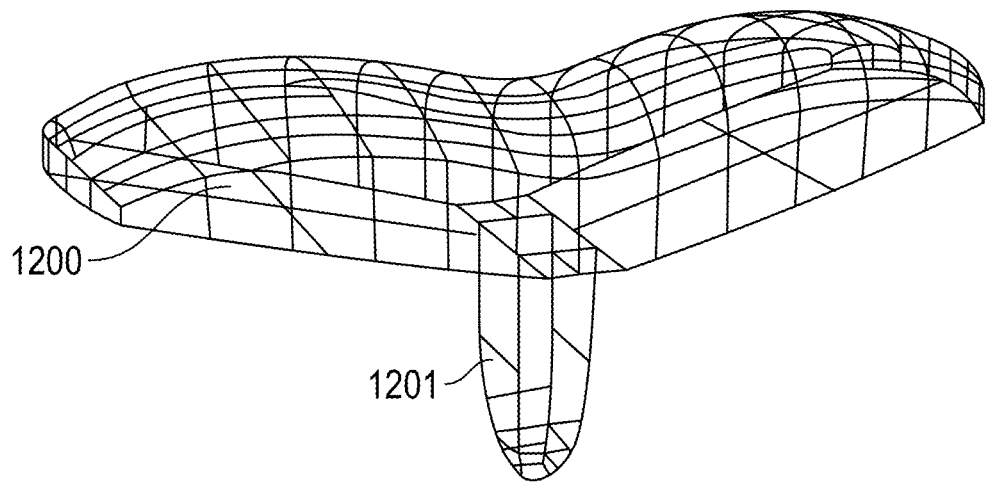
FIG. 12 is an isometric view of another example of a lens and a CPC.

In some examples, the primary optics element can be removable. In some examples, the primary optics element can or cannot be removably connected to the lens. FIG. 12 shows another example of a lens 1200 and a CPC 1201. The CPC is integrated with the lens, thus reducing two air interfaces and reducing the Fresnel loss of light.

Figure 13A:
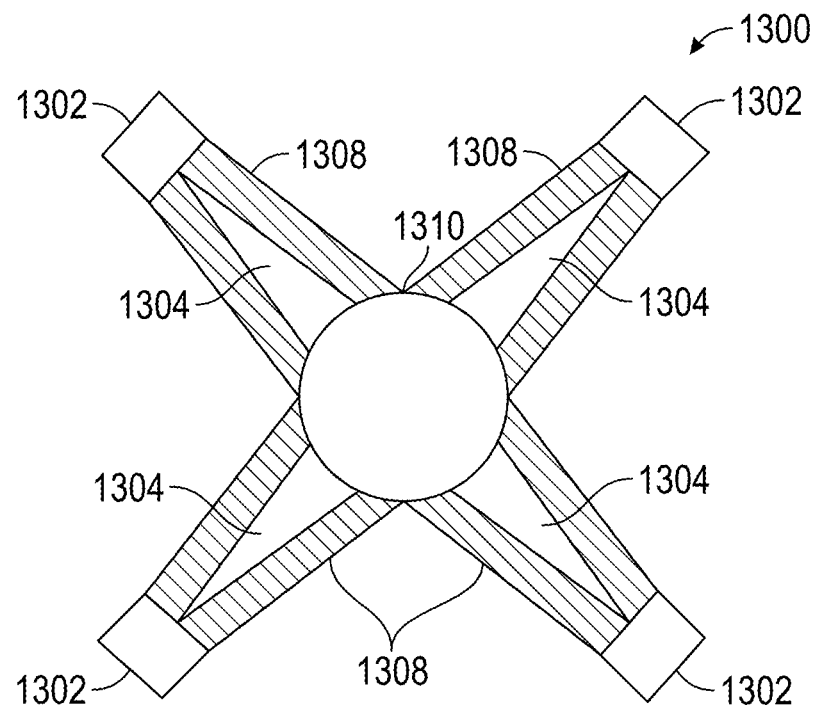
FIG. 13A is a diagrammatic view of a lighting system of one or more optical systems operable to generate a non-uniform light density distribution.

FIG. 13A illustrates an lighting system of one or more optical systems operable to generate a non-uniform light density distribution. The lighting system 1300 can include one or more optical systems, as described with respect to FIGS. 2A-2D, operable to generate a non-uniform light density distribution, as described with respect to FIGS. 5D-5E.

The light system 1300 can include one or more optical system 1302 operable to produce a non-uniform light density distribution having a central portion 1304 and a peripheral portion 1306. The central portion 1304 of the light density distribution can have a lower, reduced, and/or minimal light density relative to the peripheral portion 1306.

The light system 1300 can be operable to illuminate one or more plants 1310. The one or more plants 1310 can be illuminated by the light system 1300 to encourage substantially uniform growth. The central portion 1304 can facilitate substantially uniform growth by slowing and/or reducing growth of the plant 1310 directly toward an optical system 1302 of the light system 1300. The increased light density of the peripheral regions 1306 can encourage plant growth toward these regions, and thus away from a central portion 1304 of the optical system 1302.

Excess plant 1310 growth in the central portion 1304 can block light to remaining portions of the plant 1310, and cause substantially non-uniform plant growth. In at least one instance, a light system 1300 having four optical systems 1302 disposed in a rectangular and/or square arrangement can allow substantially uniform (e.g. substantially circular) plant 1310 growth.

Figure 13B:
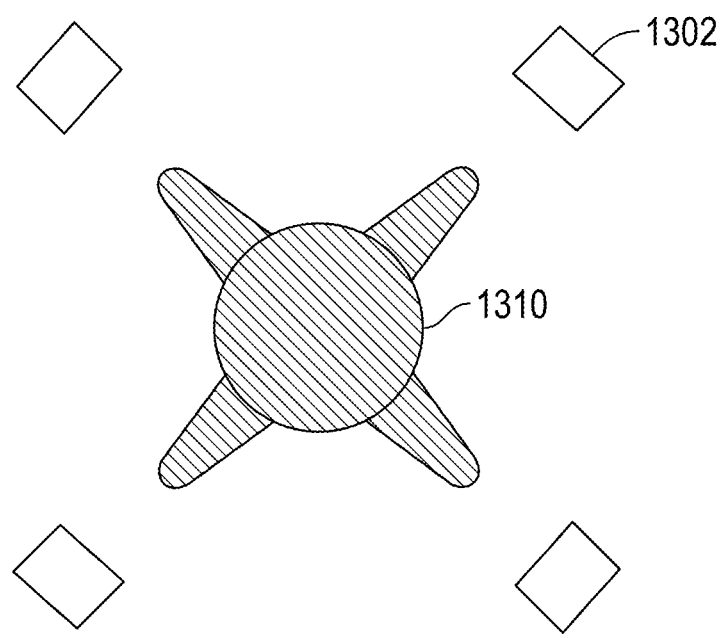
FIG. 13B is a diagrammatic view an lighting system of one or more optical systems generating a substantially uniform light density distribution.

Conversely, a light system providing a substantially uniform light density would encourage plant growth toward individual optical systems, while leaving limited plant growth therebetween. At least one instance of this arrangement is illustrated in FIG. 13B.

While FIG. 13A illustrates a light system 1300 having four optical systems arranged around one plant 1310, it is within the scope of this disclosure to implement any number of optical systems 1310. Further, while FIG. 13A illustrates a substantially planar view of a light system 1300, one of ordinary skill would appreciate that the light system 1300 can be implemented in a vertical, tiered fashion thereby encouraging multilevel plant 1310 growth.

As can be appreciated in FIG. 5D and FIG. 5E, the central portion 1304 can be approximately sixty (60) degrees wide in an x-direction (e.g. transverse) and approximately forty (40) degrees wide in a y-direction (e.g. lateral). In other instances, the central portion 1304 and the peripheral portion 1306 can be of any width and/or the central portion can be symmetrical in the transverse and lateral directions. As can further be appreciated in FIG. 5D and FIG. 5E, the central portion 1304 has a reduced light density that varies with distance from the center. The central portion 1304 light density increases slightly as it approaches the peripheral portion 1306.

While the FIG. 5 and FIG. 5E illustrates a substantially symmetrical non-uniform light density distribution with respect to the traverse and/or lateral direction, the light system 1300 of the present disclosure can be operable to produce an non-symmetrical, non-uniform light density distribution. A non-symmetrical, non-uniform light density distribution can be a symmetrical, non-uniform light density distribution in the transverse direction, while the lateral direction can have a non-symmetrical, non-uniform light density distribution. Alternatively, a non-symmetrical, non-uniform light density distribution can be a non-symmetrical, non-uniform light density distribution in the transverse direction and/or a non-symmetrical, non-uniform light density distribution in the lateral direction.

In at least one instance, the light density distribution in the transverse direction (e.g. a in FIG. 1, y-direction in FIG. 5D and FIG. 5E) can be symmetrical, non-uniform. The symmetrical distribution can allow the peripheral portion 1306 on either side of the central portion to be have substantially the same or similar light density, as shown in FIG. 5D and FIG. 5E). The light density distribution in the lateral direction (e.g. β in FIG. 1, x-direction in FIG. 5D and FIG. 5E) can be non-symmetrical, non-uniform. A non-symmetrical distribution can allow the peripheral portion 1306 to vary from the peripheral to the central portion 1304, while also varying on either side of the central portion 1304. The light density at a distal end of the light density distribution can be higher in the transverse direction, and the light density at an opposing distal end of the light density lateral can be lower. Thereby, allowing the light density distribution to be substantially symmetrical in the lateral direction and non-symmetrical in the transverse direction, while being substantially non-uniform in both the transverse direction and the lateral direction. In other instances, the light density distribution can be symmetrical and/or non-symmetrical in either the transverse direction and/or lateral direction depending on the desired light density distribution.

Non-symmetrical light density distribution can be implemented in one or more vertically stacked light systems 1300, thereby encouraging proper plant growth both vertically and horizontally and increasing growth rate and overall plant yield. In at least one instance, the non-symmetrical light distribution can provide a light density that increases from one side to the other side. In a vertical light system 1300, light on the lower side would have to travel further to reach a plant 1310, thus it is desirable to have a higher density on the lower side while a lower density on the upper side that has a shorter travel distance to a plant 130. This phenomena can be appreciated with specific respect to FIG. 2C and FIG. 2D detailing a vertical arrangement of a light system. In the instance detailed in FIG. 2C and FIG. 2D, the light density distribution in the vertical (y-axis) direction can be non-symmetrical because the light beam 24 illuminating the plant 23 can have a longer travel distance on the lower end than the upper end. The non-symmetrical light density distribution can have a higher light density on the lower end to account for the increased travel distance while having a lower light density at the upper end where the travel distance is reduced.

Figure 14:
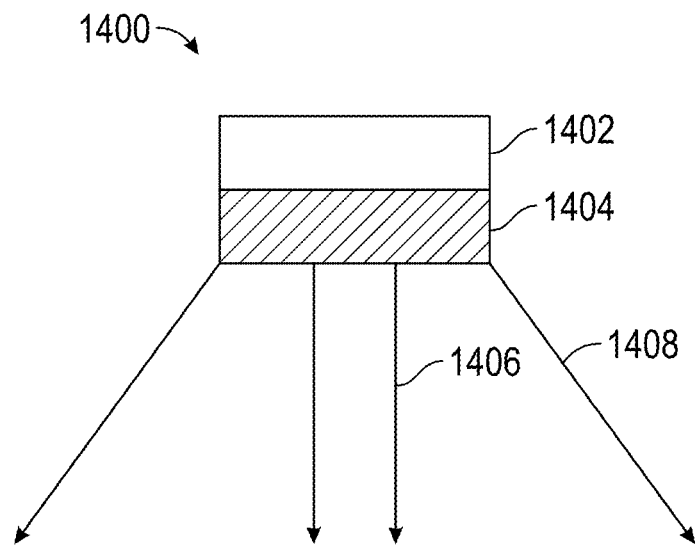
FIG. 14 is a diagrammatic view of a light source arrangement according to at least one instance of the present disclosure.

FIG. 14 illustrates a light source arrangement according to at least one instance of the present disclosure. The light source 1400 can be implemented within an optical system and/or lighting system as described in the present disclosure. The light source arrangement 1400 can include a light source 1402 and a lense module 1404. The light source 1042 can be any lighting element including, but not limited to, LED, incandescent, fluorescent, or any other light source. The lense module 1404 can be operable to produce a substantially non-uniform light density distribution from the light source 1402. The substantially non-uniform light density distribution can include a central portion 1406 and a peripheral portion 1408. The central portion 1406 can have a reduced and/or minimized light density, while the peripheral portion 1408 can have increased light density relative to the central portion 1406.

The substantially non-uniform light density distribution can prevent plant growth directly toward the light source 1402. The central portion 1406 can allow plant growth while impeding and/or reducing plant growth rate, thereby preventing plant growth from blocking the light source 1402. Further, the non-uniform light density can prevent irregular plant growth specifically toward the light source 1402, at least one instance of which is detailed in FIG. 13B.

Figure 15:
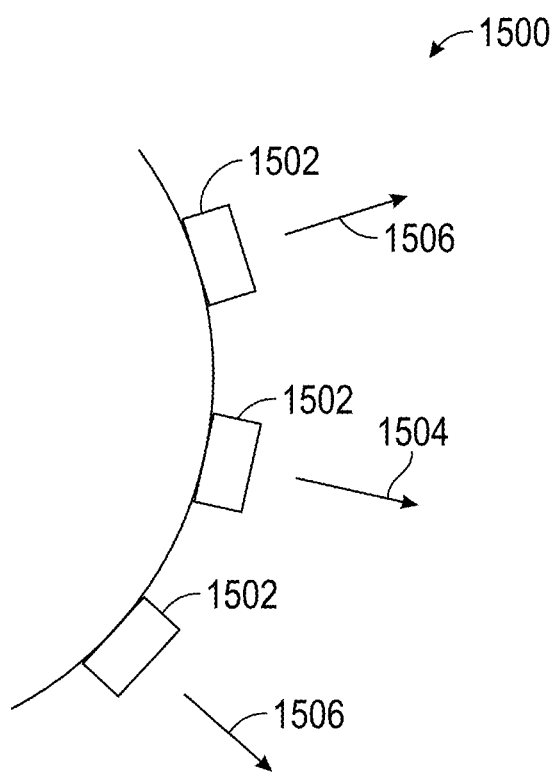
FIG. 15 is a diagrammatic view of an optical system having a light source arrangement operable to produce a substantially non-uniform light density distribution.

FIG. 15 illustrates an optical system having a light source arrangement operable to produce a substantially non-uniform light density distribution. The optical system 1500 can have a plurality of light sources 1502 operable to generate a light density distribution. The plurality of light sources 1502 can have varying power outputs, thereby causing the optical system 1500 to generate varying light densities (e.g. substantially non-uniform light density).

The optical system 1500 can include a predetermined arrangement of a plurality of light sources 1502. The predetermine arrangement can include a central portion 1504 having a reduced power output relative to a peripheral portion 1506. The central portion 1504 can have one or more light sources of the plurality of light sources 1502 having a reduced power output, while the peripheral portion 1506 can have an increased power output. The reduced power output of the central portion 1504 relative to the peripheral portion 1506 can generate a substantially non-uniform light density distribution produced by the optical system 1500. The light density distribution can have a reduced light density in a central portion corresponding to the central portion 1504 of light sources, while the peripheral portion corresponding to the peripheral portion 1506 of light sources can have an increased light density relative to the central portion.

In at least one instance, the one or more light sources 1502 within the central portion 1504 can have a power output of three (3) watts (W) and the one or more light sources 1502 in the peripheral portion 1506 can have a power output of five (5) W. In other instances, any power output can be provided by the central portion 1504 and/r the peripheral portion, such that the central portion 1504 has a reduced power output relative to the peripheral portion, thereby producing a substantially non-uniform light density distribution.

While preferred examples of the present disclosure have been shown and described herein, it will be obvious to those skilled in the art that such examples are provided by way of example only. Numerous variations, changes, and substitutions will now occur to those skilled in the art without departing from the disclosure. It should be understood that various alternatives to the examples of the disclosure described herein can be employed in practicing the disclosure. It is intended that the following claims define the scope of the disclosure and that methods and structures within the scope of these claims and their equivalents be covered thereby.

What is claimed is:

1. An optical system for facilitating plant growth, comprising:
   one or more light sources operable to produce a light density distribution having a central portion and a peripheral portion;
   wherein a central portion along a reference plane has a lower light density than the peripheral portion along the reference plane, thereby producing a substantially non-uniform light density distribution to prevent plant growth directly toward the one or more light sources,
   wherein the central portion is about sixty (60) degrees wide in a first plane and about forty (40) degrees wide in a second plane that is transverse to the first plane.

2. The optical system of claim 1, wherein the one or more light sources is a plurality of light sources.

3. The optical system of claim 2, wherein the plurality of light sources includes one or more central light sources and one or more peripheral light sources.

4. The optical system of claim 3, wherein the one or more central light sources have a reduced power output relative to the one or more peripheral light sources, thereby produce the substantially non-uniform light density distribution.

5. The optical system of claim 1, wherein the one or more light sources are coupled with a lens, the lens operable to produce the light density distribution.

6. The optical system of claim 1, wherein the one or more light sources is a light emitting diode (LED) array.

7. The optical system of claim 1, wherein the light density distribution is symmetrical in the peripheral portion.

8. The optical system of claim 1, wherein the light density distribution is non-symmetrical in the peripheral portion.

9. A light system comprising:
   one or more optical systems operable to be arranged around at least one plant, each optical system comprising:
     one or more light sources operable to produce a light density distribution having a central portion and a peripheral portion;
     wherein a central portion along a reference plane has a lower light density than the peripheral portion along the reference plane, thereby producing a substantially non-uniform light density distribution to prevent plant growth directly toward the one or more light sources,
     wherein the central portion is about sixty (60) degrees wide in a first plane and about forty (40) degrees wide in a second plane that is transverse to the first plane.

10. The light system of claim 9, wherein the peripheral portion of adjacent optical systems overlap.

11. The light system of claim 9, wherein the one or more light sources is a plurality of light sources.

12. The light system of claim 11, wherein the plurality of light sources includes one or more central light sources and one or more peripheral light sources.

13. The light system of claim 12, wherein the one or more central light sources have a reduced power output relative to the one or more peripheral light sources, thereby produce the substantially non-uniform light density distribution.

14. The light system of claim 9, wherein the one or more light sources are coupled with a lens, the lens operable to produce the light density distribution.

15. The light system of claim 9, wherein the light density distribution is symmetrical in the peripheral portion.

16. The light system of claim 9, wherein the light density distribution is non-symmetrical in the peripheral portion.

* * * * *